US008209127B2

(12) United States Patent
Moritani et al.

(10) Patent No.: US 8,209,127 B2
(45) Date of Patent: Jun. 26, 2012

(54) MOLECULAR COMMUNICATION SYSTEM AND MOLECULAR COMMUNICATION METHOD

(75) Inventors: Yuki Moritani, Yokohama (JP); Satoshi Hiyama, Yokohama (JP); Tatsuya Suda, Fallbrook, CA (US)

(73) Assignee: NTT DoCoMo, Inc., Tokyo (JP)

( * ) Notice: Subject to any disclaimer, the term of this patent is extended or adjusted under 35 U.S.C. 154(b) by 1432 days.

(21) Appl. No.: 11/740,466

(22) Filed: Apr. 26, 2007

(65) Prior Publication Data

US 2007/0254020 A1    Nov. 1, 2007

(30) Foreign Application Priority Data

Apr. 28, 2006  (JP) .................................. 2006-126699

(51) Int. Cl.
*G01N 33/50* (2006.01)
*C12P 19/34* (2006.01)
*C12Q 1/58* (2006.01)

(52) U.S. Cl. ........... 702/19; 435/6.1; 435/91.1; 977/702
(58) Field of Classification Search ........................ None
See application file for complete search history.

(56) References Cited

OTHER PUBLICATIONS

Yokokawa et al. (Journal of Microelectricalmechanical Systems (2004) vol. 13, No. 4, pp. 612-619).*
Choy et al. (Advanced Materials (2004) vol. 16, No. 14, pp. 1181-1184).*
S. Hiyama, et al., "Molecular Communication", Proceedings on NSTI Nanotechnology Conference and Trade Show 2005, ISBN 0-9767985-2-2, vol. 3, May 2005, pp. 391-394.
S. Hiyama, et al., "Molecular Communication", IEICE journal, vol. 89, No. 2, Feb. 2006, pp. 162-166.
Yuki Moritani, et al., "Molecular Communication for Health Care Applications", Proceedings on Fourth IEEE International Conference on Pervasive Computing and Communications Workshops, Mar. 2006, pp. 549-553.
Tomoki Tanaka, et al., "Shape Changes and Vesicle Fission of Giant Unilamellar Vesicles of Liquid-Ordered Phase Membrane Induced by Lysophosphatidylcholine", Langmuir, vol. 20, No. 22, Sep. 23, 2004, pp. 9526-9534.
Katsuto Takakura, et al., "A Novel System of Self-Reproducing Giant Vesicles", Journal of the American Chemical Society, vol. 125, Jun. 13, 2003, pp. 8134-8140.
Yukihiro Tamba, et al., "Single Giant Unilamellar Vesicle Method Reveals Effect of Antimicrobial Peptide Magainin 2 on Membrane Permeability", Biochemistry, vol. 44, Nov. 11, 2005, pp. 15823-15833.
Tomoki Tanaka, et al., "Membrane Fusion of Giant Unilamellar Vesicles of Neutral Phospholipid Membranes Induced by $LA^{3+}$", Langmuir, vol. 20, May 26, 2004, pp. 5160-5164.
Satoshi Hiyama, et al., "A Design of an Autonomous Molecule Loading/Transporting/Unloading System Using DNA Hybridization and Biomolecular Linear Motors", Proceedings on European Nano Systems 2005 (ENS'05), ISBN: 2-916187-02-2, Dec. 14-16, 2005, pp. 75-80.
U.S. Appl. No. 11/663,304, filed Mar. 21, 2007, Hiyama et al.
Tatsuya Suda, et al, "Exploratory Research on Molecular Communication Between Nanomachines," Genetic and Evolutionary Computation Conference, XP 002443912, Jun. 25, 2005, 5 Pages.
Michael Moore, et al., "A Design of a Molecular Communication System for Nanomachines Using Molecular Motors", Proceedings of the Fouth Annual IEEE International Conference on Pervasive Computing and Communications Workshops, XP 010910599, Mar. 13, 2006, pp. 554-559.

* cited by examiner

*Primary Examiner* — Lori A Clow
(74) *Attorney, Agent, or Firm* — Oblon, Spivak, McClelland, Maier & Neustadt, L.L.P.

(57) ABSTRACT

A molecular communication system includes a molecular transmitter (20) configured to transmit an information molecules (15) onto which prescribed information is encoded; a molecular receiver (30) configured to receive the information molecule, a molecule propagation channel (40) extending from the molecular transmitter to the molecular receiver, and a molecular capsule (10) configured to encapsulate the information molecules to be transmitted from the molecular transmitter to the molecular receiver, wherein the surfaces of the molecular transmitter, the molecular receiver, and the molecular capsule have lipid bilayer membrane structure, and wherein the system further includes encapsulation means for applying a first chemical substance to the molecular transmitter, or to the molecular transmitter and the molecular capsule to encapsulate the information molecules into the molecular capsule, and decapsulation means for applying a second chemical substance to the molecular capsule and the molecular receiver to take the information molecules out of the molecular capsule and take them into the molecular receiver.

14 Claims, 10 Drawing Sheets

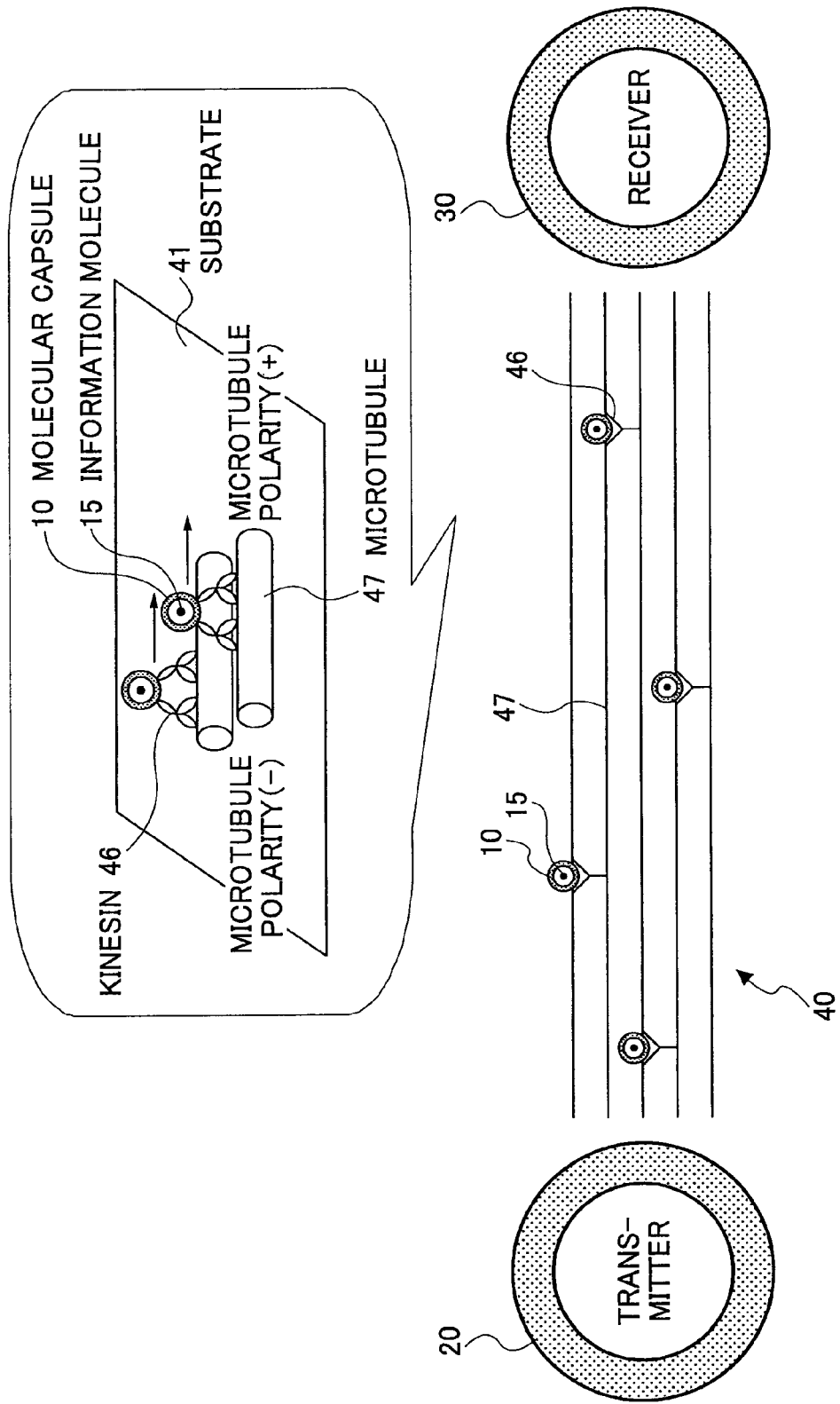

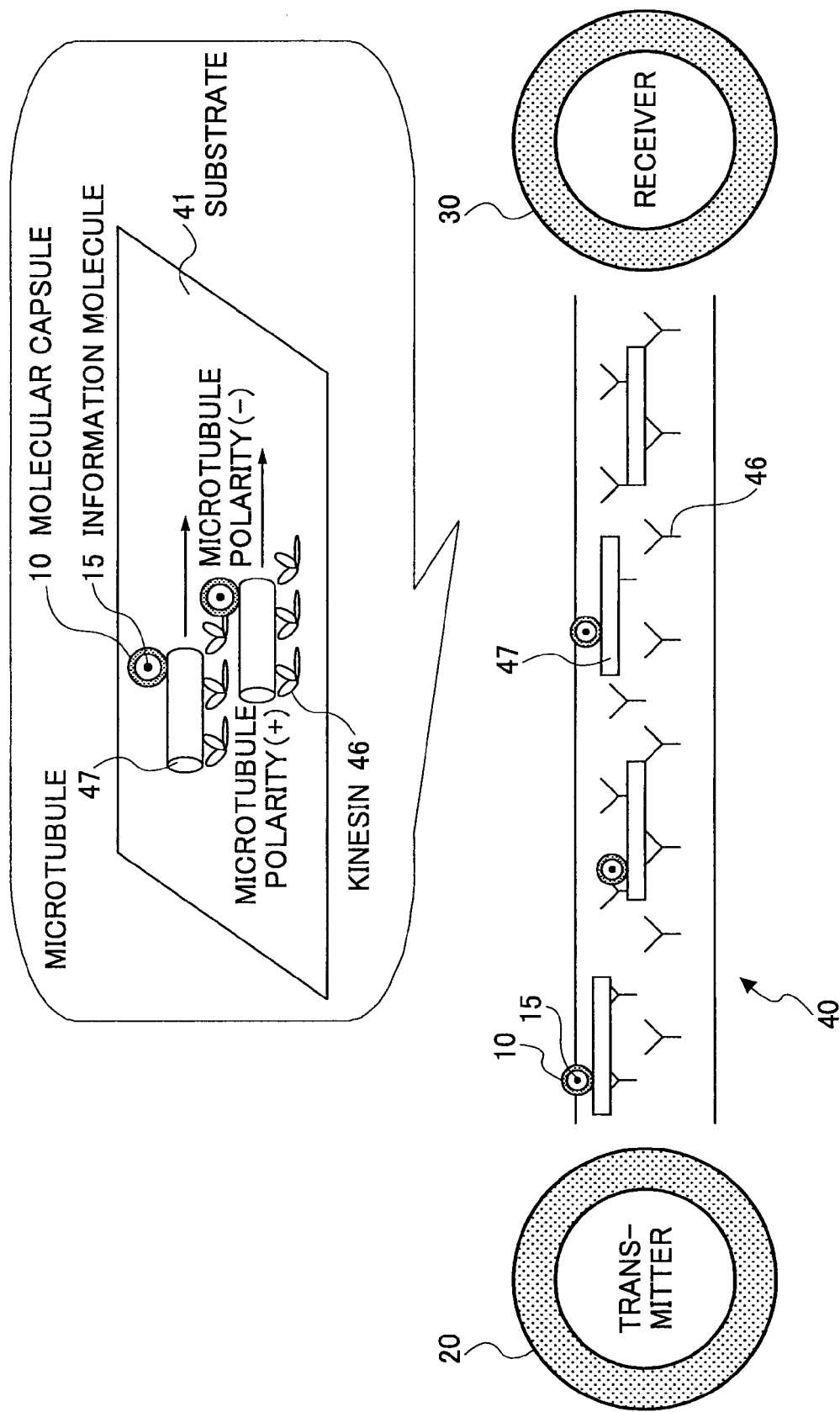

FIG.3

APPLY SOLUTION TO
MOLECULAR TRANSMITTER

MOLECULAR COMMUNICATION SYSTEM AND MOLECULAR COMMUNICATION METHOD

BACKGROUND OF THE INVENTION

1. Field of the Invention

The present invention generally relates to molecular communication, and more particularly, to a molecular communication system and method in which information encoded molecules are encapsulated in a molecular capsule and transmitted from a molecular transmitter to a molecular receiver.

2. Description of the Related Art

In recent years and continuing, studies and research have been made of molecular communication systems using nano-scale chemical substances (molecules) as information carriers. In a molecular communication system, information is encoded onto molecules and communication is done based on biochemical reactions caused upon reception of the information encoded molecules. See, for example, S. Hiyama, et al., "Molecular Communication," Proceedings on NSTI Nanotechnology Conference and Trade Show 2005, vol. 3, pp. 391-394, May, 2005, as well as S. Hiyama, et al., IEICE journal, Vol. 89, No. 2, pp. 162-166, February, 2006.

Unlike existing communication technologies that use electromagnetic waves (electric signals or optical signals) as information carriers, molecular communication uses biochemical signals which cause slow speed communication and small energy consumption. Molecular communication has high potentiality for applications of a communication between nano-scale devices that cannot use electromagnetic waves by capability reasons or environmental reasons and an operational control of nanomachines that are not composed by electronic components and cannot be driven by electronic signals.

In molecular communication, a molecular transmitter generates molecules for encoding information (referred to simply as "information molecules"), encodes information onto the information molecules, and emits the information molecules to the environment. The emitted information molecules are carried to a molecular receiver through a molecule propagation channel. The molecular receiver uptakes the propagated information molecules, decodes the information, and expresses biochemical reaction.

Information molecules in molecular communication are likely to be denaturalized due to the interaction with resolving enzyme (or degradative enzyme) existing in the propagation environment or due to environmental factors such as temperature, pH, or light, and the encoded information may be lost during the propagation. To avoid this inconvenience, it is proposed to encapsulate the information molecules in a molecular capsule called vesicle which has the lipid bilayer membrane structure. See, for example, Y. Moritani, et al., "Molecular Communication for Health Care Applications," Proceedings on Fourth IEEE International Conference on Pervasive Computing and Communications WORKSHOPS, pp. 549-553, March 2006.

This publication, however, proposes only an idea of encapsulating information molecules in a molecular capsule for propagation, and there is no method disclosed concretely for encapsulating the information molecules. Accordingly, it is desired to present how information molecules are actually encapsulated in a molecular capsule prior to transmission, and how the encapsulated information molecules are actually taken out of the molecular capsule and introduced into the molecular receiver.

SUMMARY OF INVENTION

Therefore, the embodiments of the present invention aim to provide a technique for encapsulating information molecules in a molecular capsule so as to be suitable for propagation between a molecular transmitter and a molecular receiver, and a technique for taking the information molecules out of the molecular capsule and introducing them into the molecular receiver.

To achieve this, in the embodiments, a first chemical substance is applied to a molecular transmitter, or to the molecular transmitter and a molecular capsule, to encapsulate one or more information molecules in the molecular capsule. A second chemical substance is applied to the molecular capsules and a molecular receiver to take the information molecules out of the molecular capsule and take them into the molecular receiver.

To be more precise, in one aspect of the invention, a molecular communication system includes:

a molecular transmitter configured to transmit an information molecule onto which prescribed information is encoded;

a molecular receiver configured to receive the information molecule;

a molecule propagation channel extending between the molecular transmitter and the molecular receiver; and a molecular capsule configured to encapsulate the information molecules to be transmitted from the molecular transmitter to the molecular receiver, wherein the surfaces of the molecular transmitter, the molecular receiver, and the molecular capsule have the lipid bilayer membrane structure, and wherein the system further includes:

encapsulation means for applying a first chemical substance to the molecular transmitter, or to the molecular transmitter and the molecular capsule to encapsulate the information molecules into the molecular capsule, and decapsulation means for applying a second chemical substance to the molecular capsule and the molecular receiver to take the information molecules out of the molecular capsule and take them into the molecular receiver.

With this molecular communication system, one or more information molecules are encapsulated in a molecular capsule on the transmission side, and the information molecules are taken out of the molecular capsule and introduced into the molecular receiver on the receiving side.

For example, a molecular capsule is placed near the molecular transmitter in advance and the first chemical substance is applied to the molecular transmitter and the molecular capsule by the encapsulation means to temporarily form pores in the surfaces of the molecular transmitter and the molecular capsule so as to allow the information molecules to escape from the molecular transmitter and get into the molecular capsule.

The first chemical substance may be a solution containing antimicrobial peptide.

In an alternative, the encapsulation means applies the first chemical substance to the molecular transmitter that has the information molecules inside to cause a part of the molecular transmitter to split as the molecular capsule containing a part of the information molecules inside.

In this case, the first chemical substance may be a solution containing lysophosphatidylcholine.

In still another alternative, the encapsulation means applies the first chemical substance to the molecular transmitter having the information molecules to produce the molecular capsule that encapsulates the information molecules inside of the molecular transmitter, and to allow the produced molecular capsule to be emitted to the molecular propagation channel.

In this case, the first chemical substance may be a phospholipid micellar solution.

The decapsulation means places the transmitted molecular capsule near the molecular receiver and applies the second chemical substances to the molecular capsule and the molecular receiver to temporarily form pores in the surfaces of the molecular receiver and the molecular capsule so as to allow the information molecules to escape from the molecular capsule and get into the molecular receiver.

In this case, the second chemical substance may be a solution containing antimicrobial peptide.

Alternatively, the decapsulation means applies the second chemical substance to the molecular receiver and the molecule capsule placed near the molecular receiver to fuse the molecular capsule to the molecular receiver.

In this case, the second chemical substance may be a solution containing lanthanum ion.

This system is advantageous because undesirable information loss can be avoided. Such information loss is caused by denaturalization of the information molecules due to the interaction between the transmitted information molecules and other molecules existing in the propagation environment, or by denaturalization of the information molecules due to environmental factors such as temperature or pH. In addition, because the information molecules are encapsulated, the biochemical or physical characteristics of the information molecules can be hidden from the propagation channel, and accordingly, a uniform interface can be provided. Information can be encoded not only onto a single information molecule, but also onto the concentration or the composition of a set of information molecules in the molecular capsule.

BRIEF DESCRIPTION OF THE DRAWINGS

Features and advantages of the invention will become more apparent from the following detailed description when read in conjunction with the accompanying drawings, in which:

FIG. 2A and FIG. 2B are schematic diagrams illustrating examples of the molecule propagation channel used in the molecular communication system shown in FIG. 1A;

FIG. 3 illustrates operational example 1 for encapsulating information molecules into a molecular capsule in the molecular communication system of FIG. 1A;

DETAILED DESCRIPTION OF THE PREFERRED EMBODIMENTS

Figure 1A:
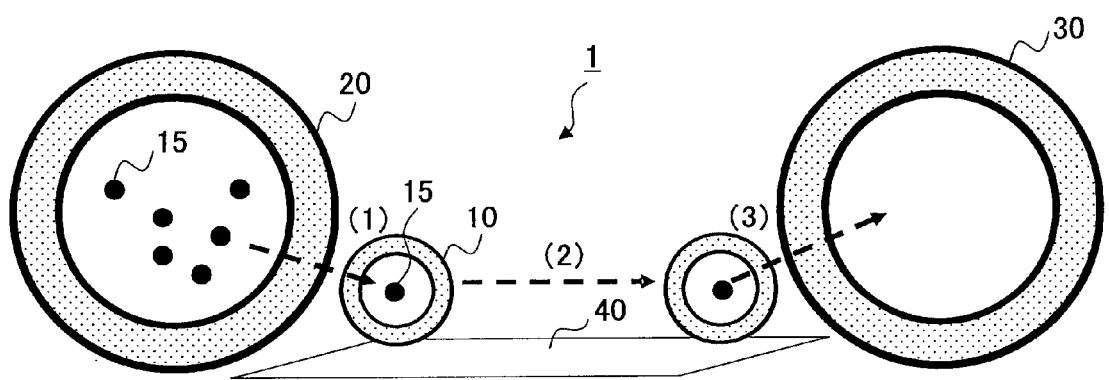
FIG. 1A and FIG. 1B are schematic diagrams for illustrating a molecular communication system according to an embodiment of the invention.
Figure 1B:
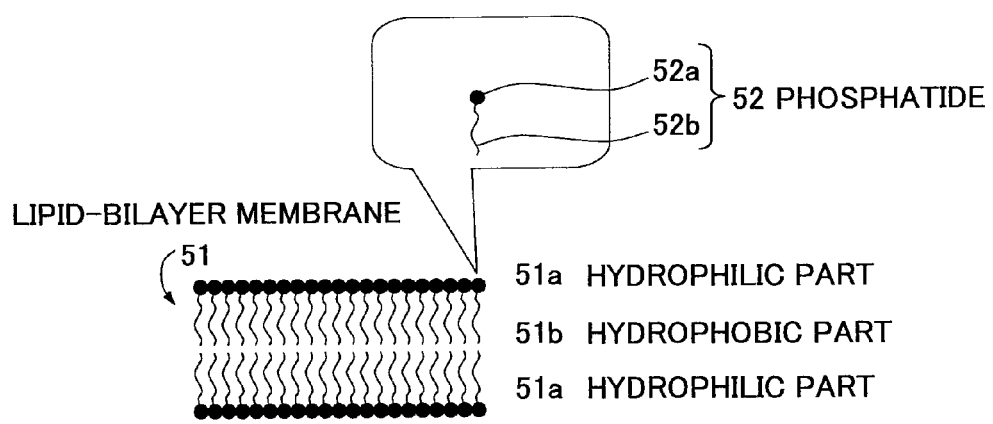

The preferred embodiments of the present invention are now described in conjunction with the attached drawings. FIG. 1A and FIG. 1B are schematic diagrams illustrating a molecular communication system according to an embodiment of the invention. The molecular communication system 1 includes a molecular transmitter 20, a molecular receiver 30, a molecular capsule 10 encapsulating an information molecule 15, and a molecule propagation channel 40 through which the molecular capsule 10 is transmitted from the molecular transmitter 20 to the molecular receiver 30. The information molecule 15 serves as an information carrier.

In the molecular communication system 1, the information molecule 15 transmitted from the molecular transmitter 20 is encapsulated into the molecular capsule 10 (indicated by the dashed arrow (1)). The information molecule 15 encapsulated in the molecular capsule 10 can be produced by applying a chemical substance to the molecular transmitter 20, or to the molecular transmitter 20 and the molecular capsule 10, the detailed operations of which will be described below.

The molecular capsule 10 encapsulating the information molecule 15 is propagated to the molecular receiver 30 through the molecular propagation channel 40 (indicated by the dashed arrow (2)).

At the molecular receiver 30, the information molecule 15 is taken out of the molecular capsule 10 and introduced into the molecular receiver 30 (indicated by the dashed arrow (3)) by applying a chemical substance to the molecular capsule 10 and the molecular receiver 30.

As illustrated in FIG. 1B, the surfaces of the molecular transmitter 20, the molecular receiver 30, and the molecular capsule 10 have the lipid bilayer membrane structure 51. The lipid bilayer membrane structure 51 is composed of lipid molecules assembled each other, each lipid molecule having a hydrophilic head 52a and a hydrophobic tail 52b. Accordingly, the lipid bilayer membrane structure 51 has a hydrophilic part 51a and a hydrophobic part 51b. This bilayer membrane structure guarantees the encapsulation, and can prevent leakage of the information molecule 15 from the molecular capsule 10. The environment in which the molecular transmitter 20, the molecular receiver 30, and the molecular capsule 10 exist is in an aqueous solution.

The molecular transmitter 20, the molecular receiver 30, and the molecular capsule 10 are, for example, liposomes composed of phosphatide (such as phosphatidylcholine). The liposome is produced by dispersing phosphatide, which becomes the major component of the membrane, in water, followed by agitation or ultrasonic treatment. The molecules used to compose the lipid bilayer membrane structure of the molecular transmitter 20, the molecular receiver 30 and the molecular capsule 10 are not limited to phosphatides, and any suitable molecules including glycolipids may be used as long as a lipid bilayer membrane structure that can prevent leakage of the information molecule 15 is acquired.

The information molecular 15 is, for example, a DNA. In ordinary conditions, DNAs do not escape from the molecular transmitter 20, the molecular receiver 30, or the molecular capsule 10. The information is encoded onto a specific base sequence or a specific structure (such as hairpin structure or bulge structure) of the information molecule 15. Alternatively, the information molecule 15 may be an ion or peptide.

In this case, the information code is not limited to base sequences or structures. When using ions, information can be encoded based upon types of the information molecules. When using peptides, the information can be encoded in amino acid sequences.

As illustrated in FIG. 2A and FIG. 2B, the molecule propagation channel 40 is constructed by motor molecules 46 and rail molecules 47 arranged so as to transport the molecular capsule 10 having the information molecule 15 inside from the molecular transmitter 20 to the molecular receiver 30. For example, kinesins can be used as the motor molecule 46, and microtubules can be used as the rail molecule 47. The moving direction of the kinesine (motor molecule) 46 is determined by the polarity of the microtubule 47.

In the example shown in FIG. 2A, rail molecules 47 are fixed to the substrate 41, while in FIG. 2B motor molecules 46 are fixed on the substrate 41, in a solution containing adenosine triphosphate (ATP). The moving speed of the molecular capsule 10 carried by the free (non-fixed) molecules is controllable by adjusting the ATP concentration, magnesium ion concentration, temperature, and/or the viscosity resistance of the solution.

The molecule propagation channel 40 is not limited to the above-described example constructed by motor molecules and rail molecules, and any suitable channel can be used as long as the molecular capsule 10 for encapsulating the information molecule 15 can be transmitted from the molecular transmitter 20 to the molecular receiver 30. For example, the molecule propagation channel 40 may be a liquid flow channel.

Next, operations of the molecular communication system 1 are explained for transmitting the information molecule 15 from the molecular transmitter 20 to the molecular receiver 30.

Figure 3:
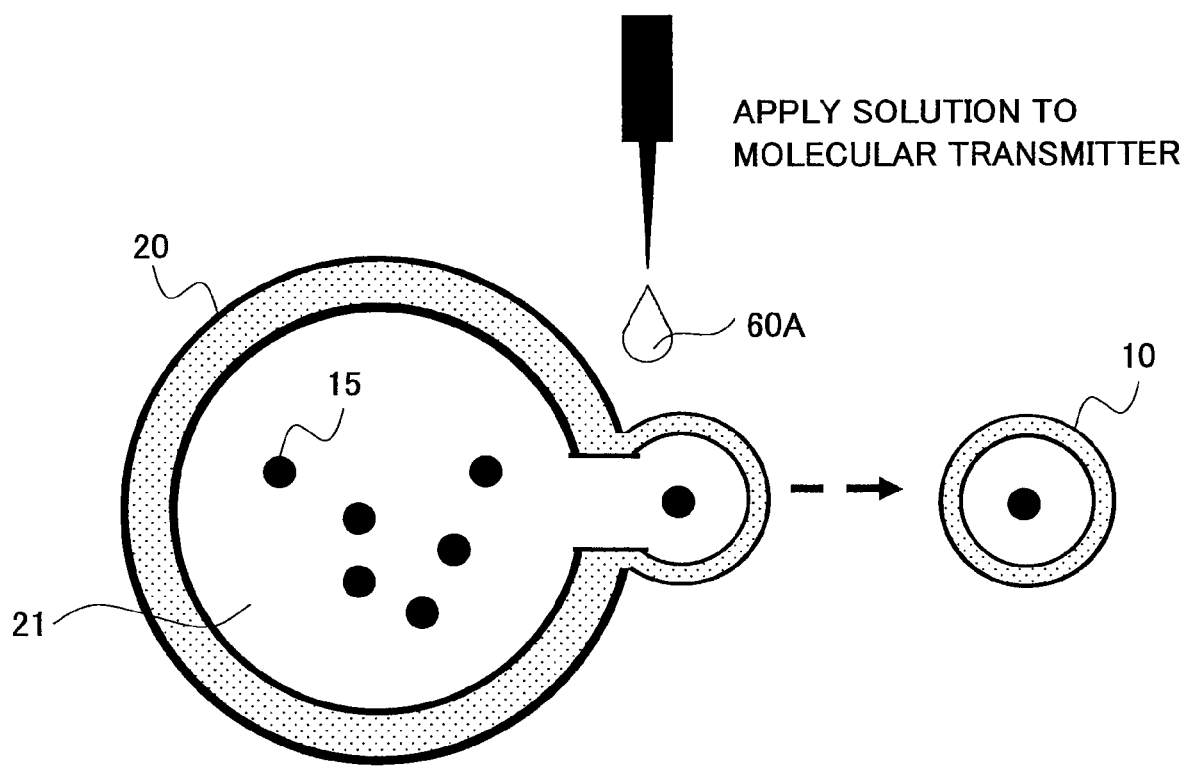
Figure 4:
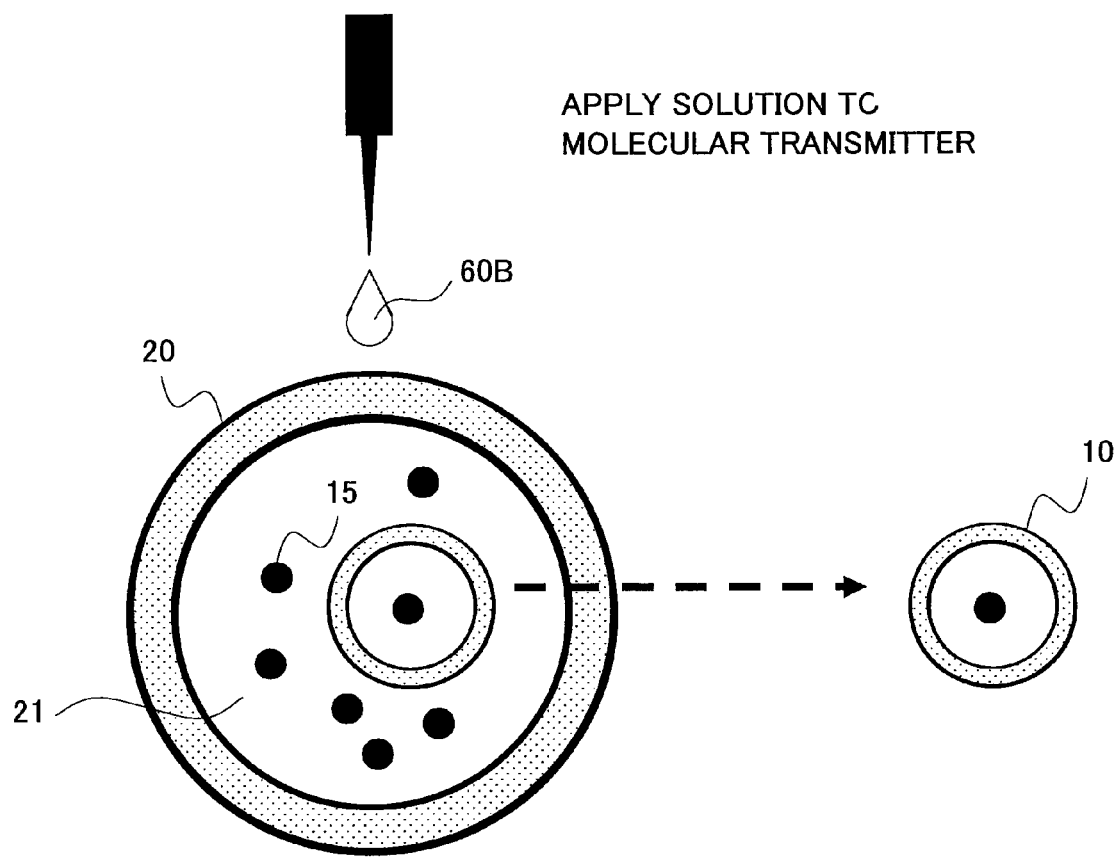
FIG. 4 illustrates operational example 2 for encapsulating information molecules into a molecular capsule in the molecular communication system of FIG. 1A.
Figure 5:
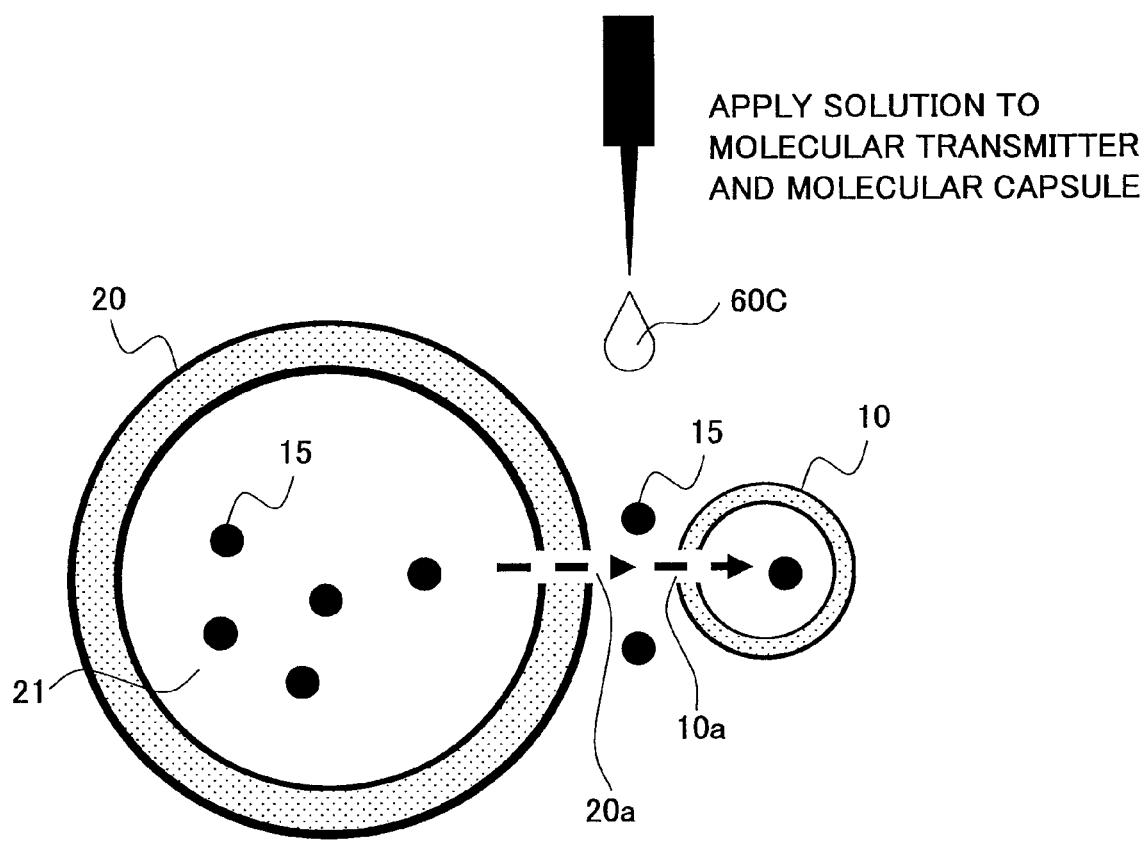
FIG. 5 illustrates operational example 3 for encapsulating information molecules into a molecular capsule in the molecular communication system of FIG. 1A.

FIG. 3 through FIG. 5 illustrate examples of encapsulation of the information molecules 15 from the molecular transmitter 20 into the molecular capsule 15. In either example, the inside of the molecular transmitter 20 is filled with a solution 21, and information molecules are dispersed homogeneously through diffusion. By applying a chemical substance to the molecular transmitter 20, or to the molecular transmitter 20 and the molecular capsule 10, the information molecule 15 encapsulated into the molecular capsule 10 can be produced at or near the molecular transmitter 20.

In the example shown in FIG. 3, a solution 60A containing lysophosphatidylcholine is applied to the molecular transmitter 20 to cause a portion of the molecular transmitter 20 to split from the molecular transmitter 20. Through this process, a molecular capsule 10 having one or more information molecules 15 inside is produced and separated from the molecular transmitter 20. In this case, the divided part of the molecular transmitter 20 becomes the molecular capsule 10 containing information molecules 15, and therefore, the concentration of the information molecules 15 encapsulated in the molecular capsule 10 are same of that in the molecular transmitter 20. Although only a single information molecule 15 is depicted in the molecular capsule 10 for simplification purpose, two or more information molecules 15 can be encapsulated in the molecular capsule 10. Details of the membrane fission caused by the solution containing lysophosphatidylcholine is described in T. Tanaka, et al., "Shape Change and Vesicle Fission of Giant Unilamellar Vesicles of Lipid-Ordered Phase Membrane Induced by Lysophosphatidylcholine," Langmuir, vol. 20, pp 9526-9534, 2004.

The solution 60A containing lysophosphatidylcholine may be applied to the molecular transmitter 20 using a micropipette at constant intervals or in response to instructions.

In FIG. 4, a solution 60B containing phospholipid micelle may be applied to the molecular transmitter 20. In this case, a molecular capsule 10 encapsulating information molecules 15 is produced inside of the molecular transmitter 20. The produced molecular capsule 10 is autonomously emitted outside of the molecular transmitter 20. The information molecules 15 are encapsulated into the molecular capsule 10 when the molecular capsule 10 is produced in molecular transmitter 20 at the same concentration as in the molecular transmitter 20. Details of the production of vesicles are described in K. Takakura, et al., "A Novel System of Self-reproducing Giant Vesicles," Journal of the American Chemical Society, vol. 125, pp. 8134-8140, 2003.

In FIG. 5, a molecular capsule 10 is placed near the molecular transmitter 20 in advance, and a solution 60C containing antimicrobial peptide is applied to the molecular transmitter 20 and the molecular capsule 10. In this case, pores 20a and 10a are formed in the surface of the molecular transmitter 20 and the molecular capsule 10, respectively, and the information molecules 15 leaked out of the molecular transmitter 20 are encapsulated into the molecular capsule 10.

The applied antimicrobial peptide solution 60C spreads in the environment and the concentration of the antimicrobial peptide decreases as time passes. Consequently, the pores 20a and 10a formed in the surface of the molecular transmitter 20 and the molecular capsule 10 are naturally closed after a certain time. Leakage of the information molecules 15 from the molecular transmitter 20 occurs naturally according to the concentration gradient; however, encapsulation of the information molecules 15 in the molecular capsule 10 occurs stochastically through diffusion. Accordingly, the concentration of the information molecules 15 encapsulated in the molecular capsule 10 may vary depending on the distance between the molecular transmitter 20 and the molecular capsule 10 or the concentration of the antimicrobial peptide solution 60C. Details of the formation of pores in a membrane are described in Y. Tamba, et al., "Single Giant Unilamellar Vesicle Method Reveals Effect of Antimicrobial Peptide Magainin 2 on Membrane Permeability," Biochemistry, vol. 44, pp. 15823-15833, 2005.

In this manner, by applying a chemical substance to the molecular transmitter 20, or to the molecular transmitter 20 and the molecular capsule 10, information molecules 15 encapsulated into the molecular capsule 10. The sequences of separation of information molecules from the molecular transmitter 20 and encapsulation of the information molecules are not limited in this order, and either one may be performed first as long as the information molecules transmitted from the molecular transmitter 20 are encapsulated into the molecular capsule 10.

Then, the molecular capsule 10 encapsulating the information molecules 15 propagates through the molecule propagation channel 40 to the molecular receiver 30.

Figure 6:
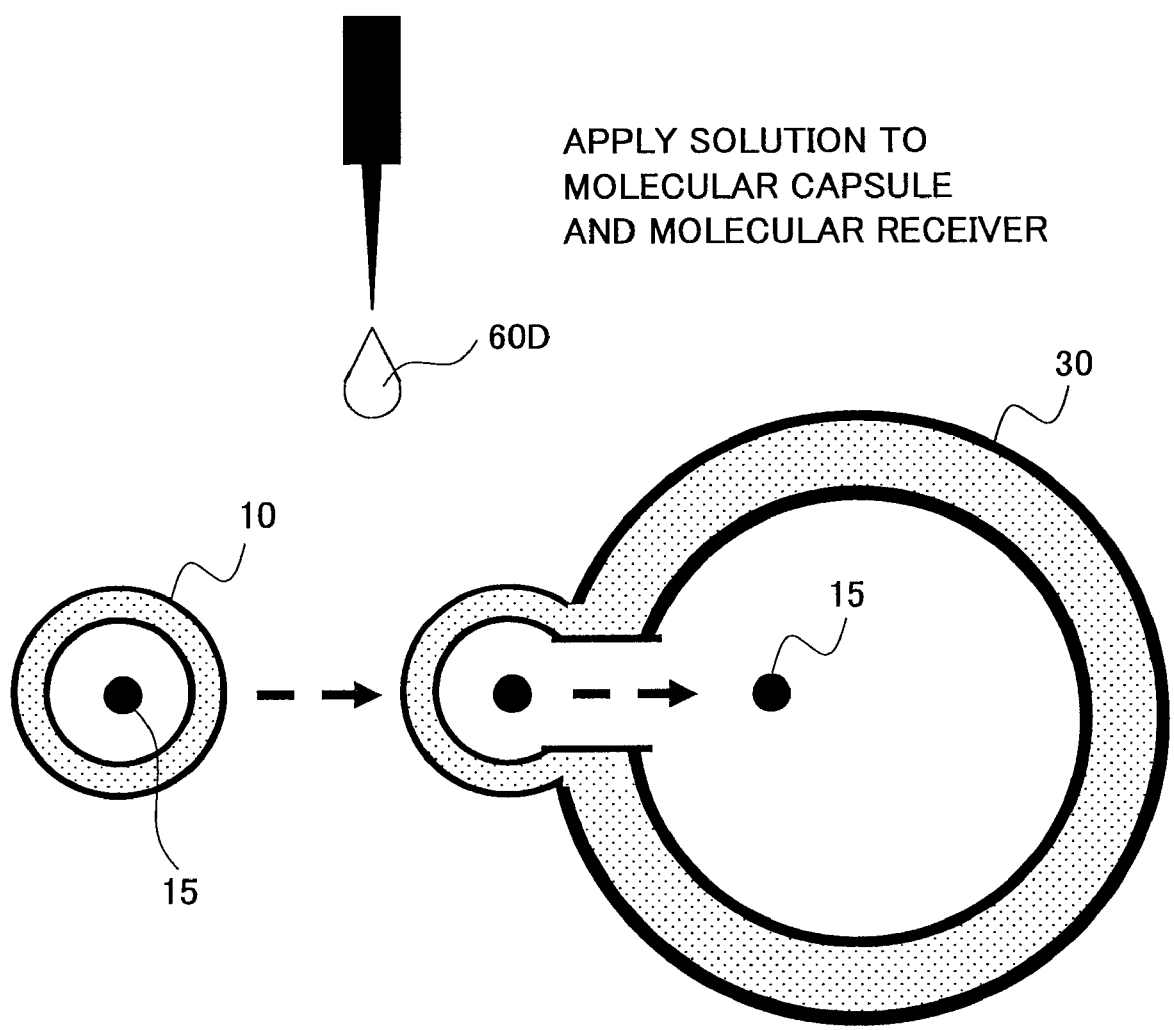
FIG. 6 illustrates operational example 1 for taking the information molecules out of the molecular capsule and getting them into the molecular receiver in the molecular communication system of FIG. 1A.
Figure 7:
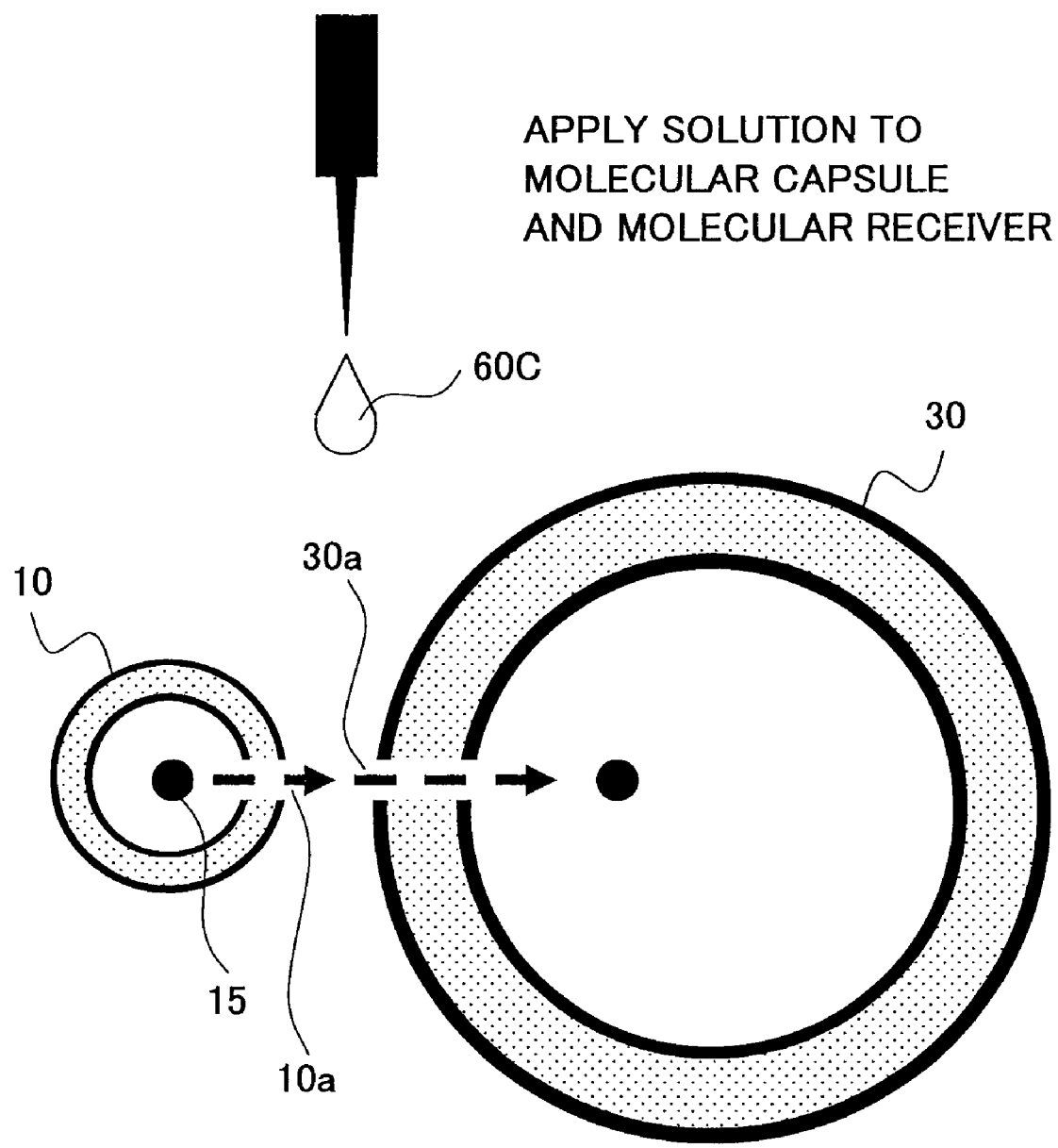
FIG. 7 illustrates operational example 2 for taking the information molecules out of the molecular capsule and getting them into the molecular receiver in the molecular communication system of FIG. 1A.

At the molecular receiver 30, the information molecules 15 can be taken out of the molecular capsule 10 and introduced into the molecular receiver 30 by applying a chemical substance to the molecular receiver 30 and the molecular capsule 10. FIG. 6 and FIG. 7 illustrate examples of the reception process of the information molecule 15.

In FIG. 6, a solution 60D containing lanthanum ion is applied to the molecular capsule 10 and the molecular receiver 30 to cause the molecular capsule 10 to fuse to the molecular receiver 30. Through the fusion, the information molecule 15 is taken out of the molecular capsule 10 and introduced into the molecular receiver 30. Because the molecular capsule 10 becomes a part of the molecular receiver 30, all the information molecules encapsulated in the molecular capsule 10 are taken into the molecular receiver 30. Details of membrane fusion are described in T. Tanaka, et al., "Membrane Fusion of Giant Unilamellar Vesicles of Neutral Phospholipid Membrane Induced by $La^{3+}$," Langmuir, vol. 20, pp. 5160-5164, 2004.

In FIG. 7, a solution 60C containing antimicrobial peptide is applied to the molecular capsule 10 and the molecular receiver 30. By the application of solution 60C, pores 10a and 30a are formed in the molecular capsule 10 and the molecular receiver 30, respectively. The information molecules 15 escape from the molecular capsule 10 through the pore 10a, and are introduced into the molecular receiver 30 through the pore 30a. As in the encapsulation shown in FIG. 5, the solution 60C containing antimicrobial peptide spreads in the environment and the concentration of the antimicrobial peptide decreases as time passes; consequently, the pores 10a and 30a formed in the molecular capsule 10 and the molecular receiver 30 close naturally as time passes. The leakage of the information molecules 15 from the molecular capsule 10 through the pore 10a occurs naturally according to the concentration gradient, and the introduction of the information molecules 15 into the molecular receiver 30 through the pore 30a occurs stochastically through diffusion. This means that the concentration of the information molecules 15 taken into the molecular receiver 30 may vary depending on the distance between the molecular capsule 10 and the molecular receiver 30, or the concentration of the solution 60C containing antimicrobial peptide.

In this manner, under the application of a chemical substance to the molecular capsule 10 and the molecular receiver 30, the information molecules 15 can be taken out of the molecular capsule 10 and introduced into the molecular receiver 30.

By performing the encapsulation and decapsulation at the molecular transmitter and the molecular receiver, respectively, a molecular communication system for transmitting the information molecules 15 from the molecular transmitter 20 to the molecular receiver 30 using a molecular capsule 10 can be realized.

Next, a modification of the embodiment is described in conjunction with FIGS. 8A, 8B, 9A and 9B. When transporting information molecules 15 encapsulated in the molecular capsule 10 through the molecule propagation channel 40 constructed by motor molecules 46 and rail molecules 47, the specific binding phenomenon between single-stranded nucleotides may be used to bind the molecular capsule 10 to the gliding microtubule (rail molecule) 47.

A method for loading a non-encapsulated information molecules on a microtubule using a specific double-stranding reaction (hybridization) between single-stranded nucleotides and for unloading the non-encapsulated information molecule from the microtubule at a prescribed location using specific dehybridization and hybridization between single-stranded nucleotides is described in S. Hiyama, et al., "A Design of an Autonomous Molecule Loading/Transporting/Unloading System Using DNA Hybridization and Biomolecular Linear Motors," Proceedings on European Nano Systems 2005, pp. 75-80, December 2005.

Figure 8A:
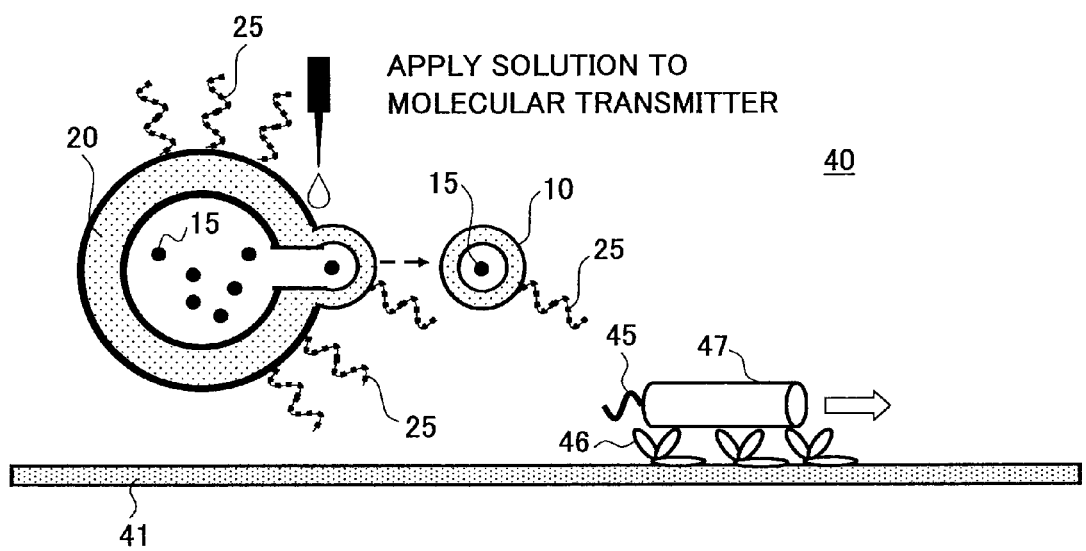
FIG. 8A and FIG. 8B illustrate a modification of the transmission side of the molecular communication system shown in FIG. 1A.

As illustrated in FIG. 8A, a microtubule 47 is moving on kinesins 46 fixed to a substrate 41 used as a part of the molecule propagation channel 40. Although only a few kinesins 46 corresponding to the current position of the microtubule 47 are depicted in the figure for simplification purpose, kinesins 46 are fixed to the entire range of the molecule propagation channel 40 along a groove extending from the molecular transmitter 20 to the molecular receiver 30. A short single-stranded nucleotide 45 is attached to the microtubule 47. The short single-stranded nucleotide 45 is designed so as to be complementary with respect to a part of the long single-stranded nucleotide 25 bound to the molecular capsule 10.

Figure 8B:
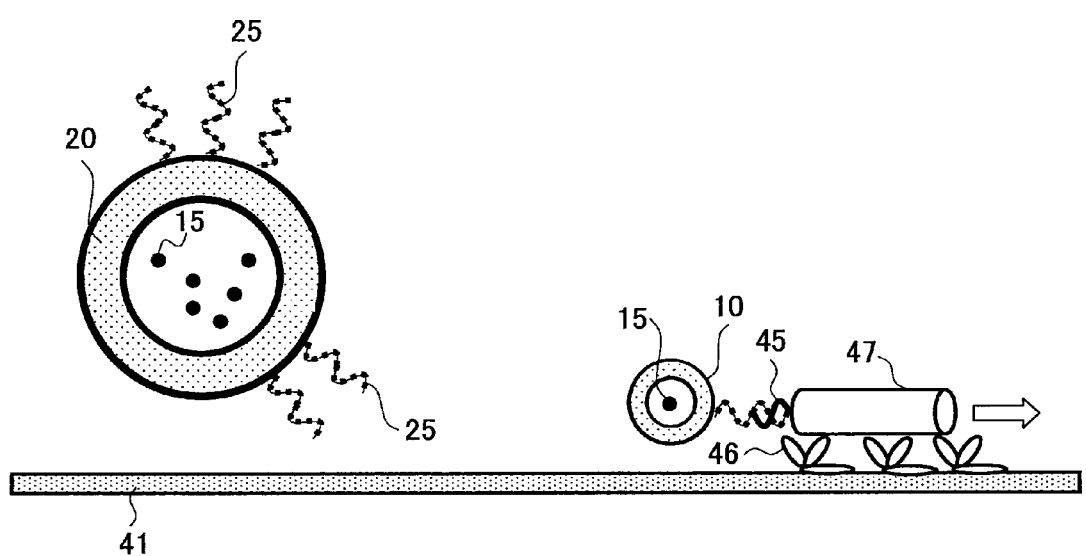

As illustrated in FIG. 8B, the short single-stranded nucleotide 45 attached to the microtubule 47 which moves along the propagation path, and the long single-stranded nucleotide 25 attached to the molecular capsule 10 which are transmitted from the molecular transmitter 20 are bound to each other using a specific double stranding reaction (hybridization). Then, the molecular capsule 10 is towed by the microtubule (rail molecule) 47 to the molecular receiver 30 (not shown in FIG. 8B).

If lysophosphatidylcholine solution 60A is used as the chemical substance for encapsulating the information molecule 15 existing in the molecular transmitter 20 into the molecular capsule 10 as illustrated in FIG. 3, it is necessary for the molecular capsule 10 to be split from the molecular transmitter 20 with a single-stranded nucleotide 25. Accordingly, single-stranded nucleotides 25 are attached to the outer surface of the molecular transmitter 20 in advance. When membrane fission occurs to produce the molecular capsule 10 under the application of lysophosphatidylcholine, the molecular capsule 10 with a single-stranded nucleotide 25 and containing the information molecule 15 inside can be emitted from the molecular transmitter 20.

If solution 60B containing phospholipid micelle is used as the chemical substance for encapsulating the information molecules 15 existing in the molecular transmitter 20 into the molecular capsule 10 as illustrated in FIG. 4, it is necessary for the molecular capsule 10 to be emitted from the molecular transmitter 20 with a single-stranded nucleotide 25. Accordingly, single-stranded nucleotides 25 are dispersed in the molecular transmitter 20 in advance. When a molecular capsule 10 encapsulating an information molecule 15 is produced and emitted from the molecular transmitter 20 under the application of the solution 60B, a single-stranded nucleotide 25 may be attached to the surface of the molecular capsule 10. Consequently, the molecular capsule 10 with a single-stranded nucleotide 25 is emitted from the molecular transmitter 20, as illustrated in FIG. 8A.

If solution 60C containing antimicrobial peptide is used as the chemical substance for encapsulating the information molecules 15 existing in the molecular transmitter 20 into the molecular capsule 10 as illustrated in FIG. 5, it is necessary for the molecular capsule 10 placed in advance near the molecular transmitter 20 with a single-stranded nucleotide 25. Accordingly, a single-stranded nucleotide 25 is attached to the molecular capsule 10 in advance. In this case, the molecular capsule 10 into which the information molecule 15 is introduced through an pore is loaded on and carried by the microtubule 47 as illustrated FIG. 8B.

Figure 9A:
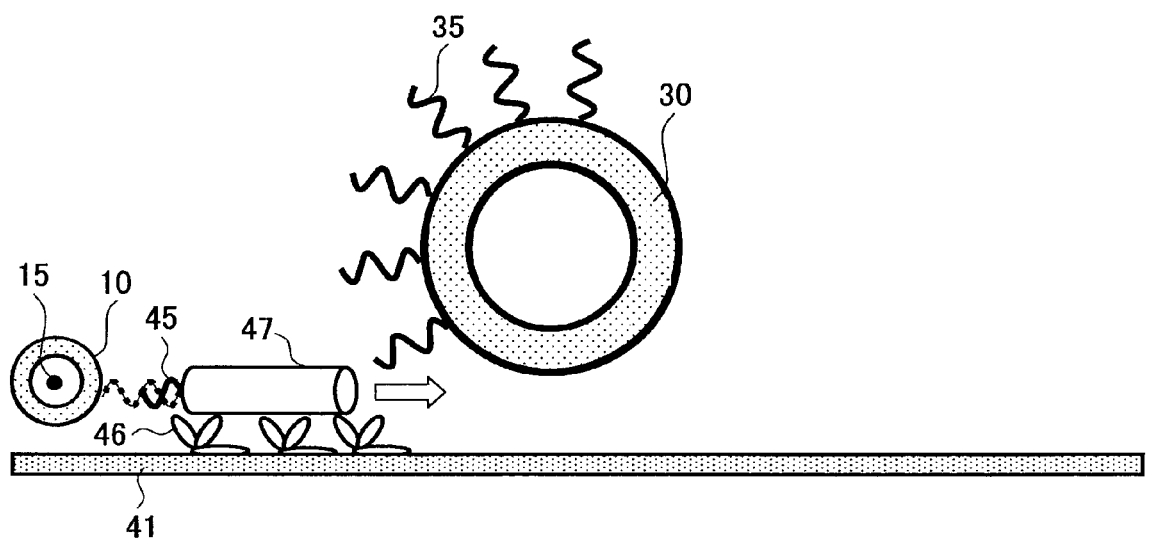
FIG. 9A and FIG. 9B illustrate a modification of the receiving side of the molecular communication system shown in FIG. 1A.
Figure 9B:
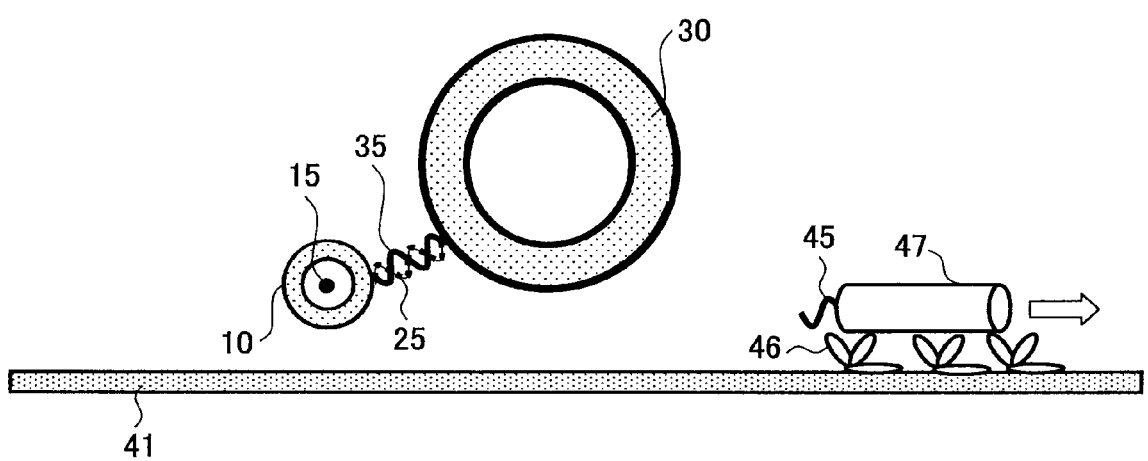

On the other hand, at the molecular receiver 30, the molecular capsule 10 has to be unloaded from the microtubule 47. Accordingly, long single-stranded nucleotides 35 which are complementary with respect to the single-stranded nucleotide 25 attached to the molecular capsule 10 are attached to the outer surface of the molecular receiver 30, as illustrated in FIG. 9A. It is more stable for the single-stranded nucleotide 25 attached to the molecular capsule 10 in its energy state to hybridize with the complementary single-stranded nucleotide 35 attached to the molecular receiver 30, rather than to hybridize with the short single-stranded nucleotide 45 attached to the microtubule 47. Consequently, when the microtubule 47 transporting the molecular capsule 10 comes closer to the molecular receiver 30, the double strand between the single-stranded nucleotide 25 of the molecular capsule 10 and the short single-stranded nucleotide 45 attached to the microtubule 47 is undone (dehybridization), and a new double strand is formed between the complementary single-stranded nucleotide 35 attached to the molecular receiver 30 and the single-stranded nucleotide 25 attached to the molecular capsule 10, as illustrated in FIG. 9B.

If solution 60D containing lanthanum ion is used as the chemical substance for taking the information molecules 15 into the molecular receiver 30 through fusion of the molecular capsule 10, as illustrated in FIG. 6, it is necessary to cut off the double-stranded nucleotides between the single-stranded nucleotide 25 attached to the molecular capsule 10 and the complementary single-stranded nucleotide 35 attached to the outer surface of the molecular receiver 30 to facilitate the fusion. Accordingly, a solution containing a restriction enzyme capable of cutting off the specific double-stranded nucleotides is applied after hybridization has occurred between the single-stranded nucleotide 25 and 35. The solution containing restriction enzyme may be applied before the solution 60D containing lanthanum ion is applied, or alternatively, the restriction enzyme may be mixed into the solution 60D containing lanthanum ion in advance and the mixed solution may be applied to the molecular capsule 10 and the molecular receiver 30.

If solution 60C containing antimicrobial peptide is used as the chemical substance for decapsulating the information molecules 15 from the molecular capsule 10 and introducing it into the molecular receiver 30 through the pores 10a and 30a, as illustrated in FIG. 7, the hybridized double strand does not affect the receiving process of information molecule 15. Consequently, the cut off process of double-stranded nucleotides described above is not required.

In the examples described above, although the complementary single-stranded nucleotides are attached to the surface of the molecular receiver 30, they may be fixed to the substrate surface near the molecular receiver 30. In this case, the single-stranded nucleotide 25 attached to the molecular capsule 10, which have propagated to the vicinity of the molecular receiver 30, is hybridized with one of the complementary single-stranded nucleotides 35 fixed to the substrate. Then, after or simultaneously with application of the solution containing restriction enzyme to the hybridized double-stranded nucleotides, the solution 60D containing lanthanum ion is applied to cause the molecular capsule 10 to fuse into the molecular receiver 30. Alternatively, the solution 60C containing antimicrobial peptide may be applied to the molecule capsule 10 unloaded to the substrate and the molecular receiver 30 to form the pores 10a and 30a, respectively, for allowing the information molecule 15 to escape from the molecular capsule 10 and get into the molecular receiver 30.

As has been described, a molecular communication system in which information molecules existing in the molecular transmitter are encapsulated into a molecular capsule, propagate to the molecular receiver, and are introduced into the molecular receiver is realized. This molecular communication system is advantageous because undesirable information loss caused by denaturalization of the information molecules due to the interaction with other molecules existing in the propagation environment or due to environmental factors such as temperature or pH can be avoided. As a result, the reliability in information communication can be improved. This molecular communication system can be applied to a communication between nano-scale devices that cannot use electromagnetic waves by capability or environmental reasons unlike in the conventional communication systems, as well as to an operational control of nanomachines that are not composed by electronic devices or equipments and cannot be driven by electronic signals.

Because the molecular communication system is driven and operated by chemical or biochemical energy, and information is encoded in nano-scale molecules, high-density information transmission can be achieved with less energy consumption compared with the conventional communication systems.

Unlike the conventional communication systems, biochemical reaction or status occurring at the transmitter represented by the biochemical molecules or the concentration of biochemical molecules can be transmitted as it is to the receiver under protection by the molecular capsule. Thus, a novel communication system based on biochemical reactions can be provided.

This international application claims the benefit of the priority date of Japanese Patent Application No. 2006-126699 filed on Apr. 28, 2006, and the entire content of which application is incorporated herein by reference.

The invention claimed is:

1. A molecular communication system comprising:
   a molecular transmitter configured to transmit an information molecule onto which prescribed information is encoded;
   a molecular receiver configured to receive the information molecule;
   a molecule propagation channel extending from the molecular transmitter to the molecular receiver; and
   a molecular capsule configured to encapsulate the information molecules, the molecular capsule being transported from the molecular transmitter to the molecular receiver;
   wherein the surfaces of the molecular transmitter, the molecular receiver, and the molecular capsule have the lipid bilayer membrane structure, and
   wherein the system further includes
   encapsulator configured to apply a first chemical substance to the molecular transmitter and the molecular capsule, the molecular capsule being placed outside the molecular transmitter at a variable distance from the molecular transmitter, to encapsulate the information molecules into the molecular capsule, and
   decapsulator configured to apply a second chemical substance to the molecular capsule and the molecular receiver to take the information molecules out of the molecular capsule and take them into the molecular receiver.

2. The molecular communication system of claim 1, wherein the encapsulation means places the molecular capsule near the molecular transmitter in advance, and applies the first chemical substance to the molecular transmitter and the molecular capsule to temporarily form pores in the surfaces of the molecular transmitter and the molecular capsule to allow the information molecules to escape from the molecular transmitter and get into the molecular capsule.

3. The molecular communication system of claim 2, wherein a solution containing antimicrobial peptide is applied as the first chemical substance to form the pores in the surfaces of the molecular transmitter and the molecular capsule.

4. The molecular communication system of claim 1, wherein the decapsulator places the molecular capsule propagated through the molecule propagation channel near the molecular receiver, and applies the second chemical substance to the molecular capsule and the molecular receiver to temporarily form pores in the surfaces of the molecular capsule and the molecular receiver to allow the information molecules to escape from the molecular capsule and get into the molecular receiver.

5. The molecular communication system of claim 4, wherein a solution containing antimicrobial peptide is applied as the second chemical substance to form the pores in the surfaces of the molecular capsule and the molecular receiver.

6. The molecular communication system of claim 1, wherein the decapsulation means places the molecular capsule propagated through the molecule propagation channel near the molecular receiver, and applies the second chemical substance to the molecular capsule and the molecular receiver to cause the molecular capsule to fuse to the molecular receiver and to take the information molecules into the molecular receiver.

7. The molecular communication system of claim 6, wherein a solution containing lanthanum ions is applied as the second chemical substance to cause the fusion of the molecular capsule to the molecular receiver.

8. A molecular communication method comprising:
preparing a molecular transmitter, a molecular receiver, and a molecular capsule for transporting an information molecule from the molecular transmitter to the molecular receiver such that the molecular transmitter, the molecular receiver, and the molecular capsule have surfaces of lipid bilayer membrane structure;
applying a first chemical substance to the molecular transmitter and the molecular capsule, the molecular capsule being placed outside the molecular transmitter at a variable distance from the molecular transmitter, to encapsulate the information molecules into the molecular capsule;
transporting the molecular capsule to the molecular receiver; and
applying a second chemical substance to the molecular capsule and the molecular receiver to take the information molecules out of the molecular capsule and take them into the molecular receiver.

9. The molecular communication method of claim 8, wherein said applying a first chemical substance comprises:
placing the molecular capsule near the molecular transmitter in advance; and
applying the first chemical substance to the molecular transmitter and the molecular capsule to temporarily form pores in the surfaces of the molecular transmitter and the molecular capsule to allow the information molecules to escape from the molecular transmitter and get into the molecular capsule.

10. The molecular communication method of claim 9, wherein a solution containing antimicrobial peptide is applied as the first chemical substance to form the pores in the surfaces of the molecular transmitter and the molecular capsule.

11. The molecular communication method of claim 8, wherein said applying a second chemical substance comprises:
placing the molecular capsule propagated through the molecule propagation channel near the molecular receiver; and
applying the second chemical substance to the molecular capsule and the molecular receiver to temporarily form pores in the surfaces of the molecular capsule and the molecular receiver to allow the information molecules to escape from the molecular capsule and get into the molecular receiver.

12. The molecular communication method of claim 11, wherein a solution containing antimicrobial peptide is applied as the second chemical substance to form the pores in the surfaces of the molecular capsule and the molecular receiver.

13. The molecular communication method of claim 8, wherein said applying a second chemical substance comprises
placing the molecular capsule propagated through the molecule propagation channel near the molecular receiver; and
applying the second chemical substance to the molecular capsule and the molecular receiver to cause the molecular capsule to fuse to the molecular receiver and to take the information molecules into the molecular receiver.

14. The molecular communication system of claim 13, wherein a solution containing lanthanum ions is applied as the second chemical substance to cause the fusion of the molecular capsule to the molecular receiver.

* * * * *